United States Patent [19]
Tsurumaru et al.

[11] Patent Number: 6,051,334
[45] Date of Patent: Apr. 18, 2000

[54] BATTERY LOCK MECHANISM FOR PORTABLE DEVICE

[75] Inventors: Shinichiro Tsurumaru; Fumio Nakadaira, both of Kawasaki, Japan

[73] Assignee: Fujitsu Limited, Kawasaki, Japan

[21] Appl. No.: 09/033,590

[22] Filed: Mar. 3, 1998

[30] Foreign Application Priority Data

May 29, 1997 [JP] Japan ................................. 9-140444

[51] Int. Cl.⁷ .................................................. H01M 2/10
[52] U.S. Cl. ........................................................... 429/97
[58] Field of Search .............................................. 429/97

[56] References Cited

U.S. PATENT DOCUMENTS

| | | | |
|---|---|---|---|
| 4,880,712 | 11/1989 | Gordecki | 429/97 |
| 5,097,384 | 3/1992 | Sunano | 361/380 |
| 5,202,197 | 4/1993 | Ansell et al. | 429/97 |
| 5,206,098 | 4/1993 | Cho et al. | 429/96 |
| 5,539,876 | 7/1996 | Saito et al. | 395/182.12 |
| 5,716,730 | 2/1998 | Deguchi | 429/97 |

FOREIGN PATENT DOCUMENTS 2 253 238  2/1992  United Kingdom .

*Primary Examiner*—Maria Nuzzolillo
*Assistant Examiner*—Susy Tsang
*Attorney, Agent, or Firm*—Armstrong, Westerman, Hattori, McLeland & Naughton

[57] ABSTRACT

A battery lock mechanism includes a first sliding operation member and a second sliding operation member. When the second sliding operation member is operated, a battery is released from a locked condition. Initially, an operation knob of the first sliding operation member is exposed through a rectangular window. When the first sliding operation member is driven in a first direction, the operation knob of the second sliding operation member is exposed through the rectangular window so that the second sliding operation member becomes movable in a second direction different from the first direction.

11 Claims, 8 Drawing Sheets

BATTERY LOCK MECHANISM FOR PORTABLE DEVICE

BACKGROUND OF THE INVENTION

1. Field of the Invention

The present invention generally relates to battery lock mechanisms and, more particularly, to a battery lock mechanism for a portable device in which a battery is removable.

2. The Related Art

Presently, portable devices such as handy terminals which are driven by a battery and in which a battery is removable are used. Changing of a battery is performed while a power switch for the portable device is turned off. Usually, however, a portable device is also equipped with a resume function lest a user removes a battery inadvertently without turning off the power switch of the portable device. The resume function enables information stored in a random access memory (RAM) to be saved in a hard disk. With the resume function, it is possible to prevent information from being destroyed even when a user inadvertently removes a battery without turning off the power switch of the portable device.

Recently, the storage volume of a RAM has increased so much that the time (resume) it takes to save information stored in the RAM into a hard disk has correspondingly increased. The resume time may be several seconds. Accordingly, a battery lock mechanism for locking a battery in a battery casing should allow for an extended resume time.

The present invention is not limited to a battery lock mechanism but is also directed to a lock mechanism for locking any other objects which need to remain locked while in use.

A conventional battery lock mechanism is constructed such that a battery accommodated in a battery casing, is released from a locked condition when a user operates an operation member. A microswitch for detecting a start of a resume operation is provided relative to the operation member.

When a user inadvertently operates an operation member for operating a battery lock mechanism while a power switch is turned on, the battery is driven out of or released from a battery casing immediately after a microswitch is activated. When this happens, information in the RAM may be destroyed.

When the user inadvertently drops a portable device while in use, the battery may be released from a locked condition so that the battery may be driven out of or released from the battery casing. This may also cause information in the RAM to be destroyed.

SUMMARY OF THE INVENTION

Accordingly, an object of the present invention is to provide a battery lock mechanism for portable devices in which the aforementioned problems are eliminated.

In order to achieve the aforementioned object, the present invention provides a battery lock mechanism wherein a first operation member and a second operation member are provided in such a relation as to prevent operation of the second operation member unless the first operation member is operated, and a battery accommodated in a battery accommodating unit of a portable device is released from a locked condition by operating the second operation member.

The invention also provides a battery lock mechanism wherein a first operation member and a second operation member are provided in such a relation as to prevent operation of the second operation member unless the first operation member is operated, a battery accommodated in a battery accommodating unit of a portable device is released from a locked condition by operating the second operation member, and a resume switch for starting a resume operation is provided so as to be operated when the first operation member is operated.

The invention also provides a battery lock mechanism, wherein the first operation member and the second operation member are operated to slide such that a direction in which the first operation member is operated to slide and a direction in which the second operation member is operated to slide are different from each other.

The invention also provides a battery lock mechanism, wherein the first operation member and the second operation member are operated to slide such that a direction in which the first operation member is operated to slide and a direction in which the second operation member is operated to slide are at right angles to each other.

The invention also provides a battery lock mechanism, wherein the first operation member and the second operation member are operated to slide such that, when the first operation member is operated, the second operation member is exposed.

The invention also provides a battery lock mechanism, wherein the first operation member and the second operation member are operated to slide such that, when the first operation member is operated, the second operation member is exposed, and the first operation member has an abutment part which is at such a location as to block the second operation member before the first operation member is operated and which is removed from the position when the first operation member is operated.

The invention also provides a lock mechanism comprising: a first operation member operated to open or close; and a second operation member provided with a lock piece and operated to open and close, opening and closing of the second operation member being disabled while the first operation member is closed, and enabled when the first operation member is open, wherein the lock piece is engaged with a lock target member when the second operation member is closed, and the engagement is removed when the second operation member is open.

The invention also provides a lock mechanism, wherein the second operation member is provided such that operation of the second operation member is enabled when the first operation member is open.

The invention also provides a portable device comprising a battery lock mechanism wherein a first operation member and a second operation member are provided in the battery lock mechanism in such a relation as to prevent operation of the second operation member unless the first operation member is operated, and a battery accommodated in a battery accommodating unit of the portable device is released from a locked condition by operating the second operation member.

DETAILED DESCRIPTION OF THE PREFERRED EMBODIMENTS

Reference will now be made in detail to the present preferred embodiments, examples of which are illustrated in the accompanying drawings, wherein like reference numbers refer to like elements throughout.

Figure 2A:
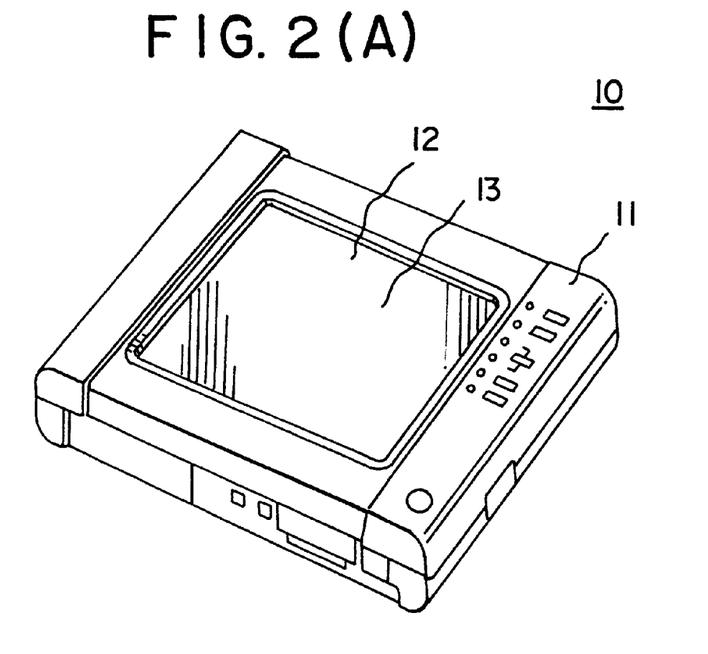
FIGS. 2(A)–(B) depict a portable device.
Figure 2B:
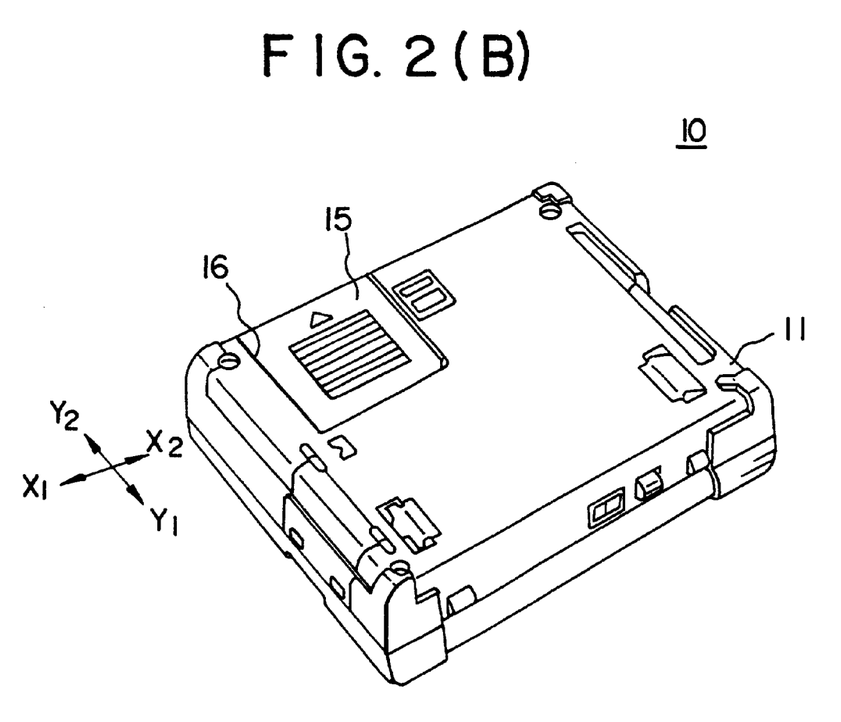

For the purpose of the description, a general description will be given of a portable device 10. As shown in FIGS. 2(A) and (B), the portable device 10 is constructed such that a liquid crystal display part 12 and a touch panel 13 covering the liquid crystal display part 12 are provided on the surface of a flat case 11, and a rechargeable battery 15 is mounted on the bottom of the case 11. The portable device 10 is operated by the battery 15 as a power source.

Figure 3:
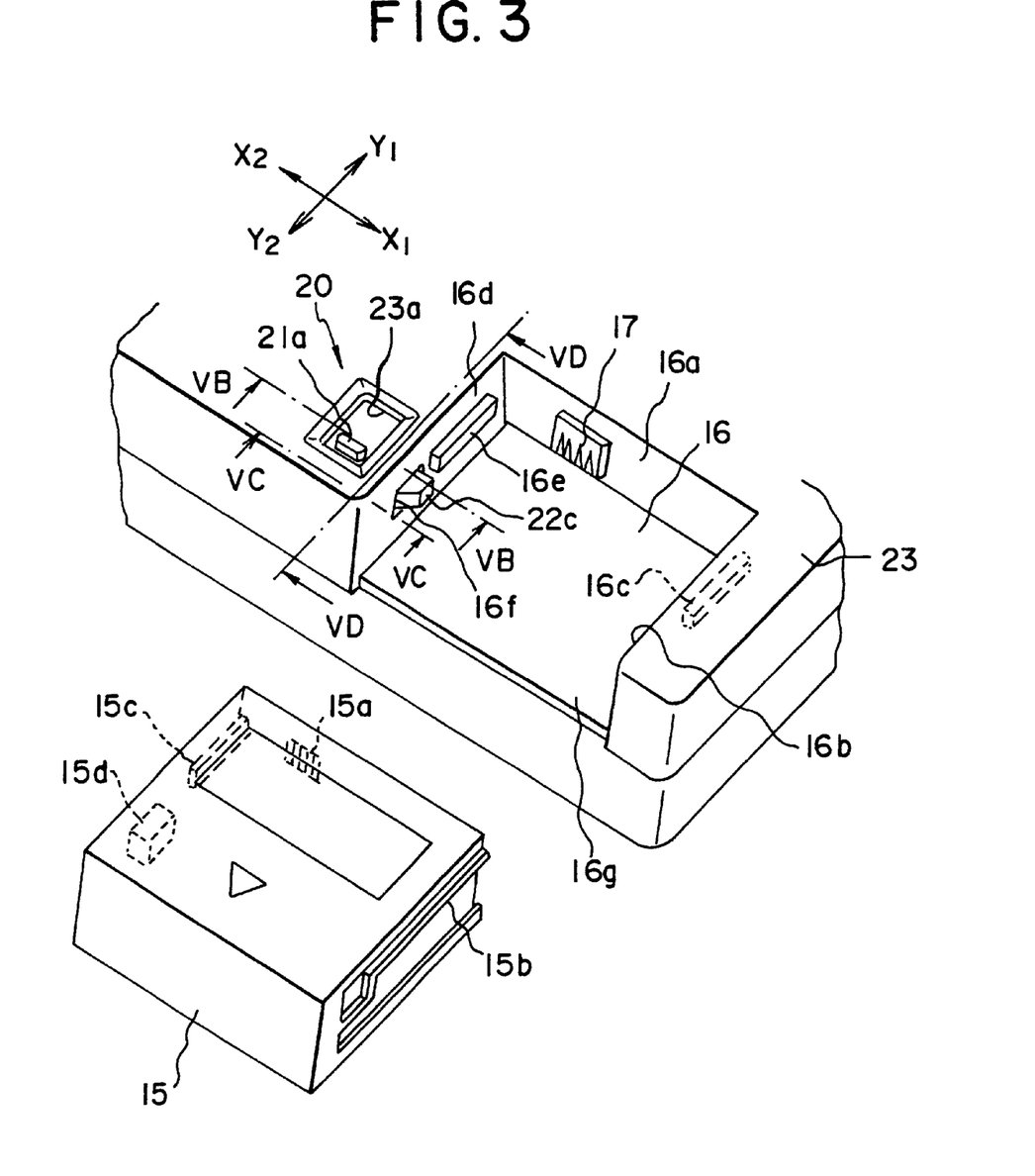
FIG. 3 depicts the battery and the battery lock mechanism in relation to each other.

As shown in FIG. 3, a battery mounting part 16 in which the battery 15 is mounted and a battery lock mechanism 20 for locking the battery 15 in the battery mounting part 16 are provided on the bottom of the portable device 10. The battery mounting part 16 is formed in a rear portion 23 of the case as a recess. The battery mounting part 16 is also provided with an opening 16g at the Y2 end.

The battery mounting part 16 is provided with a terminal 17 on a wall 16a at the Y1 and, a rib 16c on a wall 16b at the X1 end, and a rib 16e on a wall 16d at the X2 end. An opening 16f is provided in the wall 16d at the X2 end. A lock piece 22c projects from the opening 16f.

The battery 15 has a terminal 15a corresponding to the terminal 17, grooves 15b and 15c corresponding to the ribs 16c and 16e, respectively, and a recess 15d corresponding to the lock piece 22c.

A description will now be given of the battery lock mechanism 20 according to a preferred embodiment of the present invention.

As shown in FIGS. 4 and 5(A) through (D), the battery lock mechanism 20 is provided near the X2 end of the battery mounting part 16 and generally comprises a first sliding operation member 21 and a second sliding operation member 22 underneath the first sliding operation member 21. Of course, the expression "underneath" is relative because when the portable device is in use, the liquid crystal display part 12 faces upward so that the second sliding operation member 22 is above the first sliding operation member 21. The following description assumes that the portable device 10 is turned upside down in describing the vertical relative positions, in which case the sliding position member 22 is underneath the sliding operation member 21. For the purposes of description, the sliding operation member 21 constitutes a "first" operation member and the sliding operation member 22 constitutes a "second" operation member.

Figure 5A:
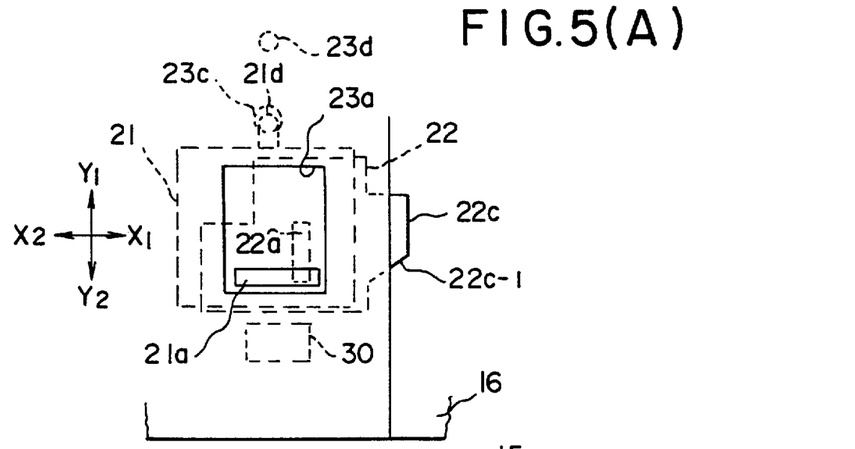
FIGS. 5(A)–(D) depict several sectional views of the battery lock mechanism.
Figure 5B:
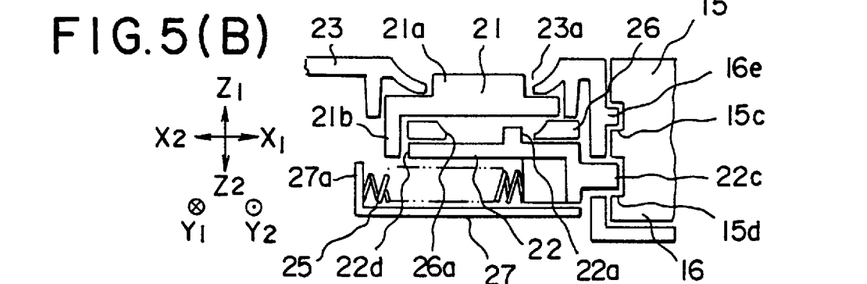
Figures 5C, 5D:
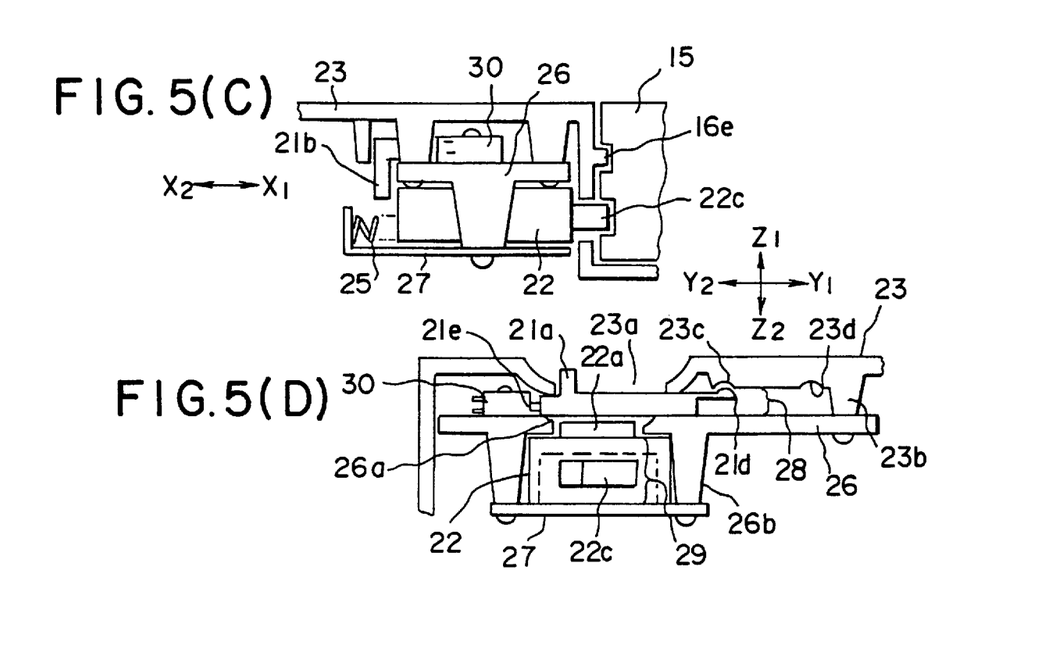

FIG. 5(B) is a sectional view taken along the line VB—VB in FIG. 3, FIG. 5(C) is a sectional view taken along the line VC—VC in FIG. 3, and FIG. 5(D) is a sectional view taken along the line VD—VD in FIG. 3.

Figure 4:
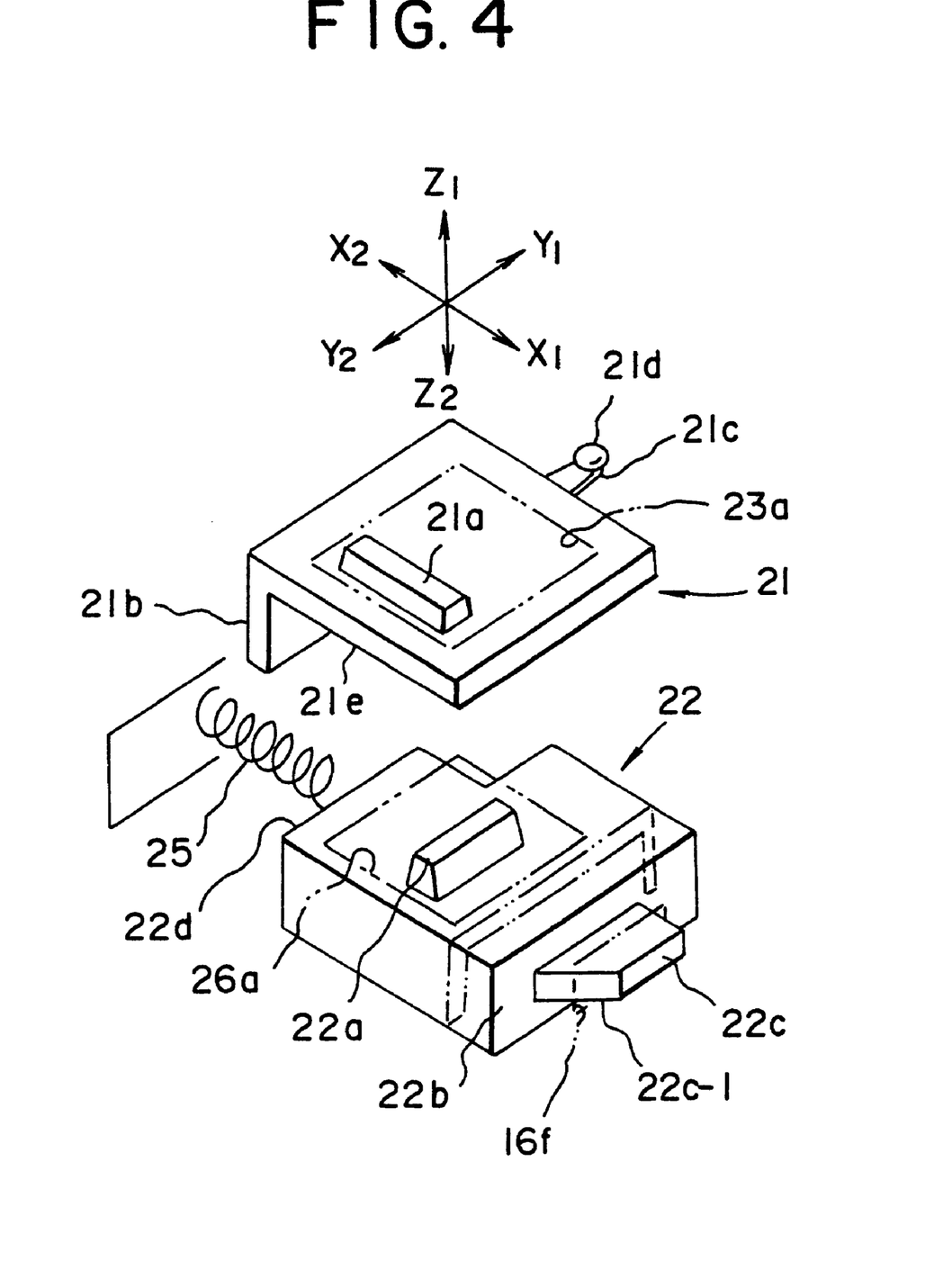
FIG. 4 depicts a schematic perspective view showing the battery lock mechanism.

The first sliding operation member 21 has an operation knob 21a on the upper surface thereof and a downwardly-projecting abutment side plate 21b along the X2 end. The abutment side plate 21b constitutes an abutment part as claimed. The first sliding operation member 21 is immediately behind the rear portion 23 of the case in the Z2 direction. The operation knob 21a is exposed in a rectangular window 23a of the rear portion 23 of the case so as to be slidable in the Y1 direction. The first operation member 21 is also provided with an arm 21c projecting from the Y1 end in the Y1 direction. A hemispherical projection 21d that operates to stop the first sliding operation member 21 is formed on the upper surface of the end of the arm 21c.

As indicated by a broken line of FIG. 5(D) and an alternating long and two short dashes line FIG. 4, the second sliding operation member 22 has a truncated inverse U-shaped cross section and is provided with an operation knob 22a on the upper surface thereof. A lock piece 22c projects from a surface 22b at the X1 end. The lock piece 22c has a slanting surface 22c-1 at the Y2 end thereof. The second sliding operation member 22 is located behind the first sliding operation member 21 in the Z2 direction. The operation knob 22a is exposed in a rectangular opening 26a of a first partition 26. The lock piece 22c is exposed in the battery mounting part 16 through the opening 16f so as to be slidable in the X2 direction. The second sliding operation member 22 is urged in the X1 direction by a helical compression spring 25. The second sliding operation member 22 is located at an extreme position displaced in the X1 direction so that the lock piece 22c projects to the battery mounting part 16 via the opening 16f.

As described later, the second sliding operation member 22 is directly related to locking of the battery, while the first sliding operation member 21 is not directly related to locking of the battery and is related to locking and opening/closing of the second sliding operation member 22.

Figure 1A:
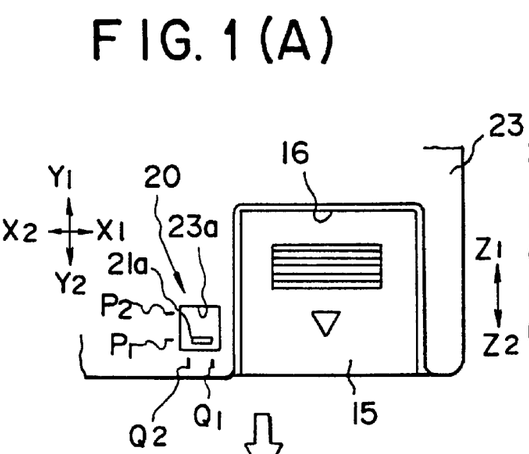
FIGS. 1(A)–(D) illustrate the lock removal of the battery lock mechanism according to a preferred embodiment of the present invention.
Figure 1B:
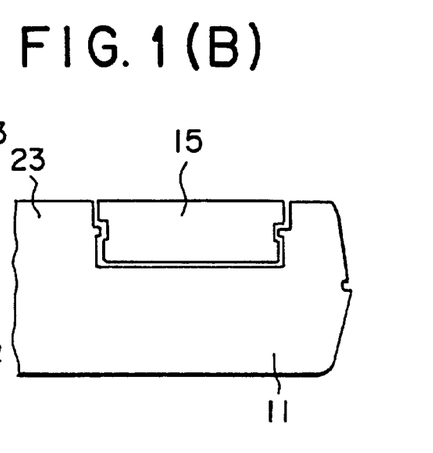
Figure 1C:
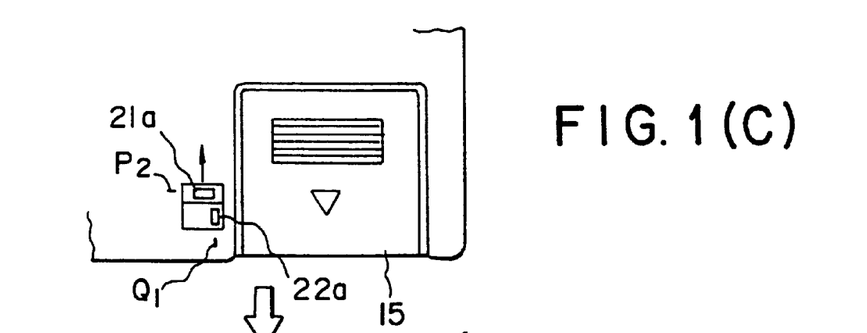
Figure 1D:
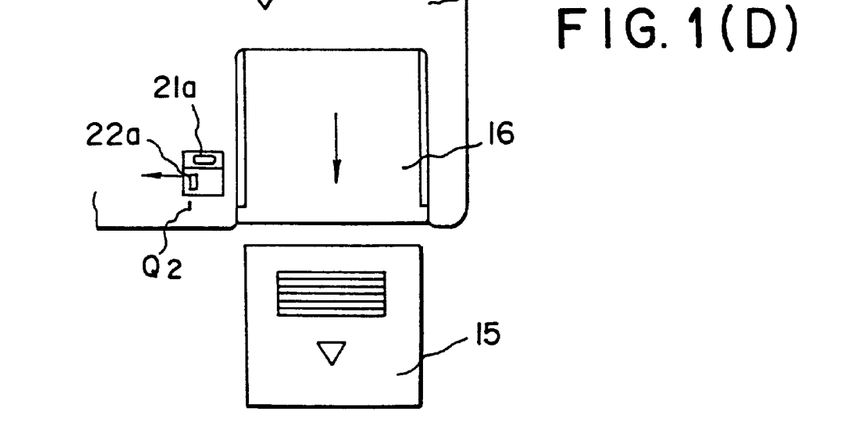

The positions of the first and second sliding operation members 21 and 22 will be described by describing the operational knobs 21a and 22a. As shown, for example, in FIGS. 1(A), (C), and (D), P1 indicates a position of the first sliding operation member 21 before the operation, P2 indicates a position of the first sliding operation member 21 when operated by a user, Q1 indicates a position of the second sliding operation member 22 before the operation, and Q2 indicates a position of the second sliding operation member 22 operated by the user.

A description will now be given of a mechanism for supporting the first and second sliding operation members 21 and 22.

As shown most notably in FIG. 5(D), the first partition 26 is screwed to a leg part 23b projecting from the back of the rear portion 23 of the case. A second partition 27 is screwed to a leg part 26b projecting from the first partition 26. A first partitioned space 28 corresponding to a size of the first sliding operation member 21 exists between the rear portion 23 of the case and the first partition 26, and a second partitioned space 29 corresponding to a size of the second sliding operation member 22 exits between the first partition 26 and the second partition 27. The rectangular window 26a of the first partition 26 is located immediately below the rectangular window 23a of the rear portion 23 of the case so that the rectangular window 23a and the rectangular window 26a are in alignment with each other in the Z2 direction.

The first sliding operation member 21 is accommodated in the first partitioned space 28 and the second sliding operation member 22 is accommodated in the second partitioned space 29.

Hemispherical recesses 23c and 23d corresponding to the hemispherical projection 21d are formed on the back of the rear portion 23 of the case. The recesses 23c and 23d define the positions of the first sliding operation member 21.

A microswitch 30 operates as a resume switch. The resume switch 30 is fixed to the first partition 26.

The helical compression spring 25 is fitted on the second partition 27 such that one end of the helical compression spring 25 is fixed to the interior of the second sliding operation member 22 and the other end thereof is in contact with an upright part 27a of the second partition 27.

A description will now be given of how the battery 15 is mounted in the battery mounting part 16 and how the battery lock mechanism 20 locks the battery 15.

The battery lock mechanism 20 operates as follows when the battery 15 is removed.

FIGS. 1(A)–(B), 5(A)–(D), and 6(A) show a state in which the battery 15 is mounted in the battery mounting part 16 and the battery lock mechanism 20 locks the battery 15.

Figure 6A:
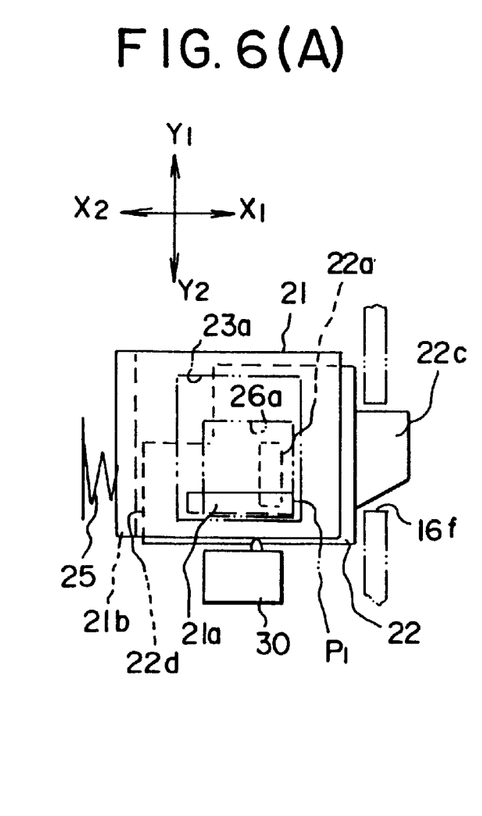
FIGS. 6(A)–(C) illustrate the lock release operation of the battery lock mechanism.

The battery 15 is locked in the battery mounting part 16 such that the grooves 15b and 15c are fitted to the ribs 16c and 16e, respectively, and the lock piece 22c is fitted to the recess 15d. The terminal 15a is in contact with the terminal 17.

The first sliding operation member 21 is moderately locked at the position P1 such that the projection 21d is fitted to the recess 23c. An end face 21e (FIG. 5(D)) presses the resume switch 30 so that the resume switch is turned off. The second sliding operation member 22 is located at the position Q1 due to a spring force of the helical compression spring 25. The lock piece 22c projects through the opening 16f so as to be fitted to the recess 15d.

The operation knob 21a is exposed in the rectangular window 23a. The operation knob 22a is covered by the first sliding operation member 21 so as to be inoperable. In addition, an X2 end face 22d of the second sliding operation member 22 is opposite to the downwardly-extending abutment side plate 21b of the first sliding operation member 21 so that an X2 movement of the second sliding operation member 22 is prevented by the end face 22d being blocked by the abutment side plate 21b.

Figure 7:
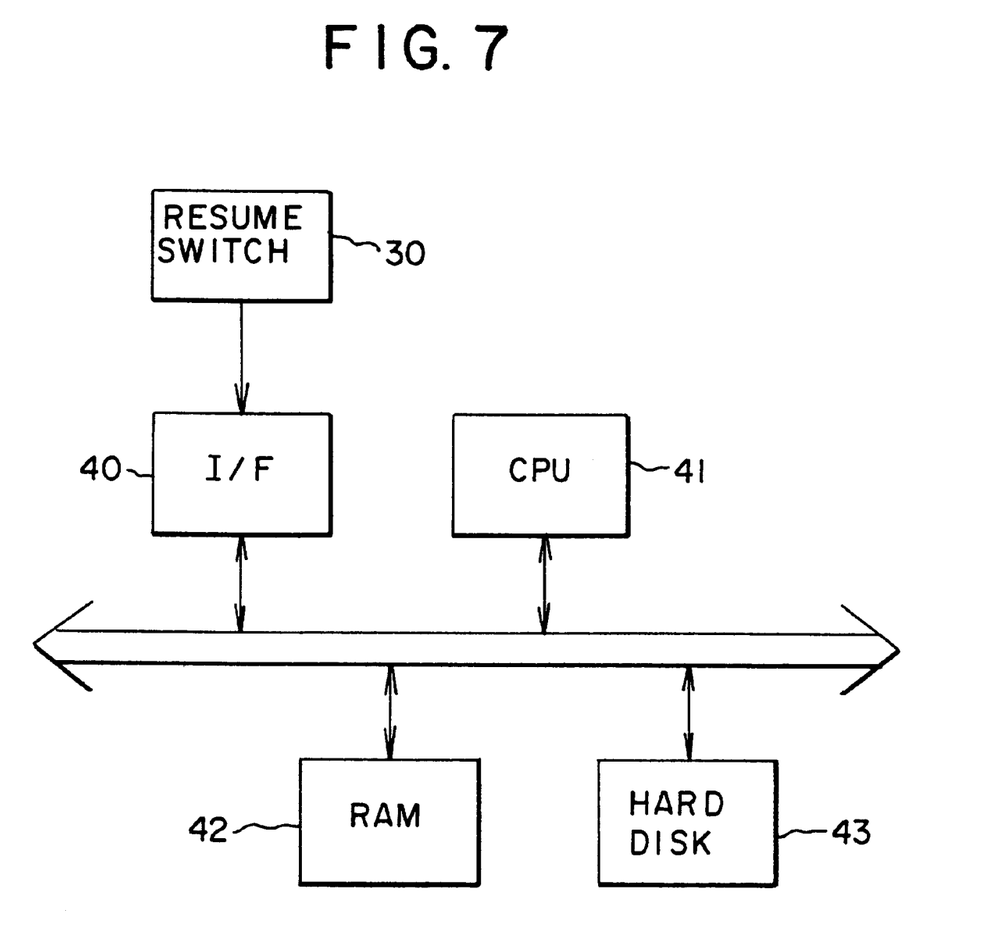
FIG. 7 is a block diagram of a circuit for performing a resume operation upon removal of the battery lock.

As shown in FIG. 7, the portable device 10 having the resume function is provided with a CPU 41, the resume switch 30, an interface 40, a RAM 42 and a hard disk 43.

A description will now be given of the operation of the battery lock mechanism 20 when the battery is replaced.

I. Removal of an Exhausted Battery

First, the user performs a first operation for operating the operation knob 21a in the Y1 direction. Subsequently, the user performs a second operation for operating the operation knob 22a in the X2 direction while slightly holding the battery 15.

The first operation dislocates the projection 21d from the recess 23c so as to be fitted to the other recess 23d. The first sliding operation member 21 slides in the Y1 direction to reach the position P2 and is held in a locked condition there.

Figure 6B:
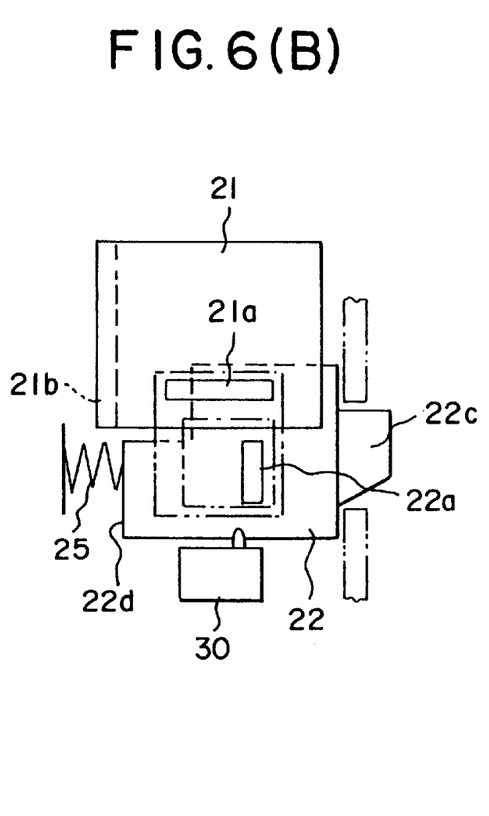

The first operation puts the battery lock mechanism 20 in a state shown in FIG. 1(C) and FIG. 6(B).

That is, (1) the first operation immediately turns the resume switch 30 on. While the power switch of the portable device 10 is on, the resume operation, described later, is started.

(2) The first sliding operation member 21 recedes from the rectangular window 23a so that the rectangular window 26a and the operation knob 22a are exposed in the rectangular window 23a.

(3) The abutment side plate 21b of the first sliding operation member 21 is dislocated from the position opposite to the X2 end face 22d of the second sliding operation member 22 so that a restriction on movement in the X2 direction of the second sliding operation member 22 is removed. As a result, the second sliding operation member 22 becomes operable. See, e.g., FIG. 6(B).

Subsequently, the battery 15 is slightly held. In this state, the second operation for operating the operation knob 22a in the X2 direction against the force exerted by the helical compression spring 25 is performed.

Figure 6C:
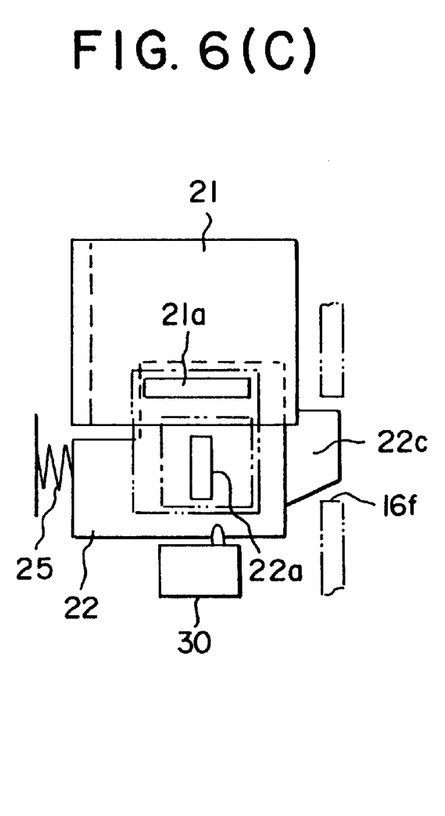

As a result of the second operation, the second sliding operation member 22 is caused to slide in the X2 direction so that the battery lock mechanism 20 is put in a state shown in FIG. 1(D) and FIG. 6(C). That is, the lock piece 22c recedes in the opening 16f. As a result, the battery 15 is released from a locked condition so that the battery 15 can be moved out of the battery mounting part 16 in the Y2 direction so as to be removable.

When the operator releases the operation knob 22a, the second sliding operation member 22 is caused to return to the original position due to a force of the helical compression spring 25, so that the battery lock mechanism 20 is put in a state shown in FIG. 1(C) and FIG. 6(B).

It is to be noted that there are two operations involved, after the resume switch is turned on, in order for the battery 15 to be removed from the battery mounting part 16. That is, the operation knob 21a should be driven to the edge of the rectangular window 23a and the operation knob 22a should be operated by an operator. In other words, two steps are required in order to remove the battery 15. Accordingly, it takes time before the battery 15 becomes removable. Approximately several seconds are required after the resume switch 30 is turned on before the battery 15 is removed from the battery mounting part 16. Thus, it is ensured that the resume operation is completed.

II. Fitting of a New Battery

A new battery is mounted by being inserted in the battery mounting part 16 in the Y1 direction. The battery 15 presses the slanting surface 22c-1 so as to temporarily press the lock piece 22c into the opening 16f. The battery 15 is locked in its place when the lock piece 22c-1 projects back again. Subsequently, the operation knob 21a is driven by the user in the Y2 direction so as to reach the position P1. As a result, the battery lock mechanism 20 is put in a state shown in FIG. 1(A) and FIG. 6(A).

In order to ensure that the mounted battery is securely locked, the first sliding operation member 21 is closed so as to prevent operation or movement of the second sliding operation member 22. Since the first sliding operation member 21 is not urged by a spring or the like, there is a likelihood that the user may forget to close the first sliding operation member 21. When the user forgets to close the first sliding operation member 21, the second sliding operation member 22 may be opened due to an inadvertent operation so that the battery is removed while the power is turned on. Accordingly, it is configured such that the resume switch 30 detects that the first sliding operation member 21 is closed in order to effect control of the power. That is, when the first sliding operation member 21 is open, the resume switch 30 remains turned on so that the power is prevented from being turned on. When the first sliding operation member 21 is closed, the resume switch 30 is turned off so that the power can be turned on.

As described above, two steps including the first operation and the second operation are required in order to remove the battery 15 such that the second operation is not enabled unless the first operation is completed. With this arrangement, inadvertent removal of the battery is prevented. By insuring that the direction in which the first operation is performed is at right angles with the direction in which the second operation is performed, it is further ensured that inadvertent removal of the battery is unlikely to occur.

Figure 8:
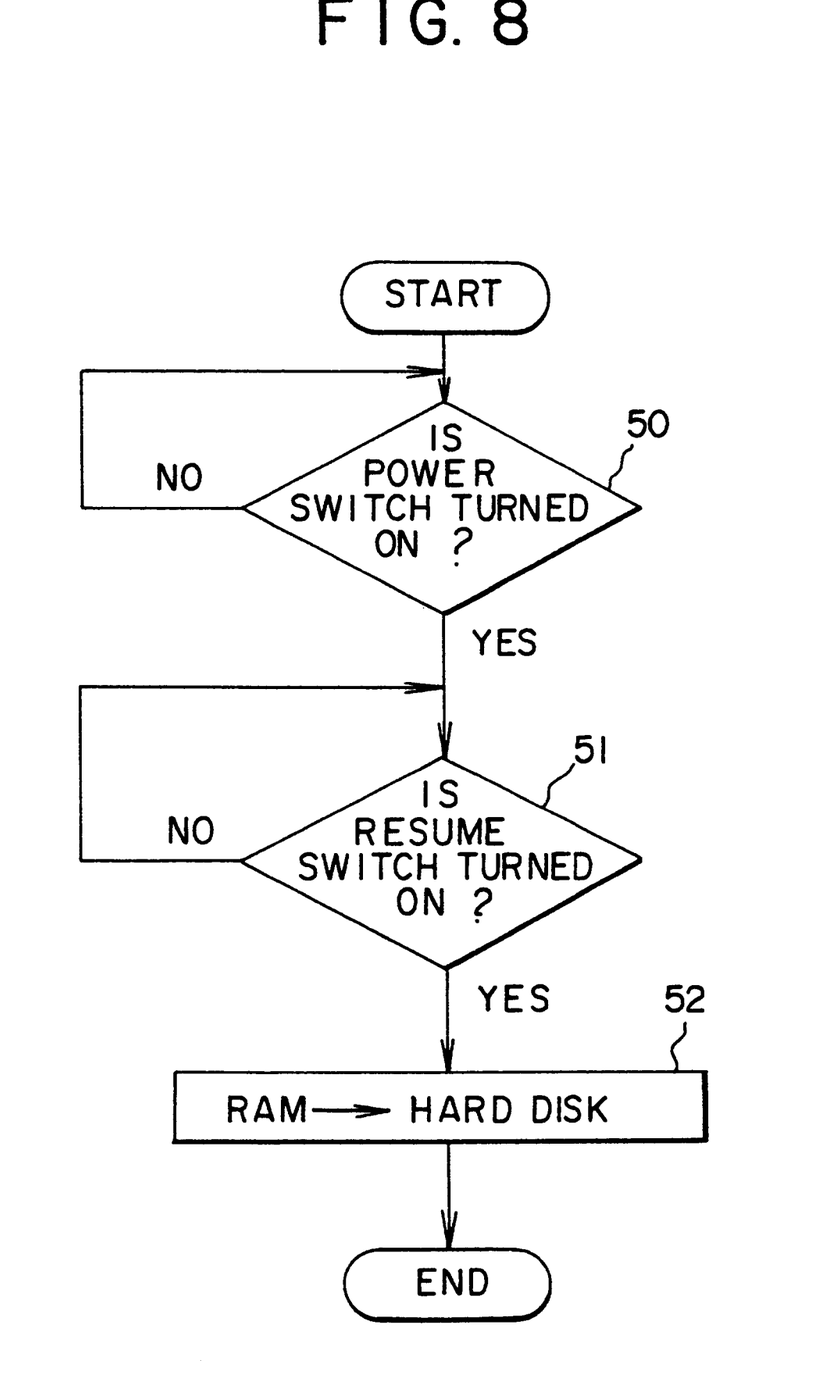
FIG. 8 is a flowchart of the resume operation.

A description will now be given, with reference to FIG. 8, of a case where the user inadvertently tries to remove the battery while the power is turned on.

When the first operation described above is started, the resume switch 30 is immediately turned on. When the resume switch 30 is turned on while the power of the portable device 10 is ON (steps 50, 51), the resume operation is started in step 52 such that information stored in the RAM 42 is saved in the hard disk 43.

In a period of time after the start of the operation in step 52 and until the battery is removed, the second operation described above should be performed. It takes about several seconds before the second operation is completed. Accordingly, even when the RAM 42 has a large storage volume and requires an extended resume time, it is ensured that the resume operation is completed before the battery is removed. An accident wherein the information in the RAM 42 is destroyed is prevented.

A description will now be given of a case where the portable device 10 is inadvertently dropped while in use (while the power switch is turned on).

Depending on the posture of the portable device 10 as it is dropped to the floor and depending the shock exerted on the portable device 10 is it is dropped to the floor, a force for driving the second sliding operation member 22 in the X2 direction may be exerted on the second sliding operation member 22.

Since the X2 end face 22d of the second sliding operation member 22 is opposite to the downwardly-facing abutment side plate 21b of the first sliding operation member 21, the second sliding operation member 22 is prevented from moving in the X2 direction by coming into contact with the abutment side plate 21b.

Accordingly, even when the portable device 10 is inadvertently dropped to incur a considerable shock that produces a force to move the second sliding operation member 22 in the X2 direction, the battery lock mechanism 20 is maintained in a state shown in FIGS. 5(A) through (D). As a result, the battery remains locked. There is no likelihood that the battery is inadvertently removed.

The first sliding operation member 21 and the second sliding operation member 22 may be replaced by a first rotating operation member and a second rotating operation member.

The battery lock mechanism 20 is applicable not only to a hand terminal as described above but is applicable for providing a similar effect in any device configured with a removable battery.

The embodiment described above is constructed such that a surface of the battery is flush with the bottom surface of the portable device 10 while the battery is being mounted. That is, the portable device 10 is not provided with a battery cover. However, the present invention is also applicable to a construction in which a battery cover is provided such that the battery cover is closed and locked while the battery is being mounted. The present invention is also applicable to a construction in which the mounted battery is locked and the battery cover is also locked while being closed to cover the battery.

The present invention is not limited to battery lock mechanism but is also applicable to other lock mechanisms to lock an object that should remain locked while in use.

As described above, according to the invention, a first operation member and a second operation member are provided in such a relation as to prevent operation of the second operation member unless the first operation member is operated, and a battery accommodated in a battery accommodating unit of a portable device is released from a locked condition by operating the second operation member. Thus, two steps including a first operation and a second operation should be performed in order to remove a battery. Therefore, it is insured that it is less likely that the battery is inadvertently removed than in a conventional construction where only a single step is required to release the battery from a locked condition. With this, reliability is improved.

Further, even when a mobile device is inadvertently dropped so as to incur a considerable shock, the battery lock mechanism is maintained in a state in which the battery remains locked. Accordingly, inadvertent removal of the battery does not occur, thus improving the reliability.

According to another aspect of the invention, a resume switch for starting a resume operation is provided so as to be operated when the first operation member is operated. Therefore, even when a user inadvertently tries to remove the battery without turning off the power switch of the mobile device, an extended period of time is required, after the resume operation is started, before the battery becomes removable, thus ensuring that the resume operation is properly completed and information in the RAM is prevented from being destroyed.

According to another aspect of the invention, the direction in which the first operation member is operated and the direction in which the second operation member is operated are different from each other. With this arrangement, the user is more aware of the operation of the second operation member than in a conventional construction in which the direction in which the first operation member is operated is the same as the direction in which the second operation member is operated. Accordingly, an inadvertent error is less likely to occur than in the conventional construction. As a result, the reliability is improved.

According to yet another aspect of the invention, the direction in which the first operation member is operated and the direction in which the second operation member is operated are at right angles to each other. Thus, the user is more aware of the operation of the second operation member. Accordingly, an inadvertent error is less likely to occur than in a conventional construction. As a result, the reliability is improved.

According to a further aspect of the invention, the first operation member and the second operation member are both operated to slide. In addition, when the first operation member is operated, the second operation member is exposed. Accordingly, the construction whereby operation of the second operation member is prevented unless the first operation member is operated is simplified.

According to another aspect of the invention, the first operation member and the second operation member are both operated to slide. In addition, when the first operation member is operated, the second operation member is exposed. Further, the first operation member has an abutment part which is in such a location as to block the second operation member before the first operation member is operated and which is removed from the position when the first operation member is operated. Accordingly, it is further ensured that operation of the second operation member is prevented unless the first operation member is operated.

According to yet another aspect of the invention, a lock mechanism includes a first operation member operated to open or close; and a second operation member provided with a lock piece and operated to open and close, opening and closing of the second operation member being disabled while the first operation member is closed, and enabled when the first operation member is open, wherein the lock piece is engaged with a lock target member when the second operation member is closed, and the engagement is removed when the second operation member is open. With this construction, two steps including a first operation and a second operation should be performed in order to release a target object from a locked condition. Therefore, it is ensured that it is less likely that the target object is inadvertently removed than in a conventional construction where only a single step is required to release the target object from being locked. With this, reliability is improved. Even when a mobile device is inadvertently dropped so as to incur a considerable shock, the lock mechanism is maintained in a state in which the lock target object remains locked. Accordingly, inadvertent removal of the lock target object does not occur, thus improving the reliability.

Another aspect of the invention improves a previous feature of the invention by providing the second operation member such that operation of the second operation member is enabled when the first operation member is open. Accordingly, the construction whereby operation of the second operation member is prevented unless the first operation member is operated is simplified.

According to a further aspect of the invention, a first operation member and a second operation member are provided in the battery lock mechanism in such a relation as to prevent operation of the second operation member unless the first operation member is operated, and a battery accommodated in a battery accommodating unit of the portable device is released from a locked condition by operating the second operation member. Therefore, it is ensured that it is less likely that the battery is inadvertently removed than in a conventional construction where only a single step is required to release the battery from being locked. Even when a mobile device is inadvertently dropped so as to incur a considerable shock, inadvertent removal of the battery does not occur.

What is claimed is:

1. A battery lock mechanism of a portable device having a battery accommodating unit accommodating a battery, said battery lock mechanism comprising:

a first operation member slidably operable into first and second positions; and a second operation member having a lock piece extending into the battery accommodating unit to lock the battery, said second operation member is prevented from being slidably operable when said first operation member is in the first position, and said second operation member is slidably operable to withdraw the lock piece from the battery accommodating unit to release the battery from the battery accommodating unit when said first operation member is operated into the second position.

2. The battery lock mechanism as claimed in claim 1, wherein said first operation member and said second operation member are slidable in directions different from each other.

3. The battery lock mechanism as claimed in claim 1, wherein said first operation member and said second operation member are slidable in directions at right angles to each other.

4. The battery lock mechanism as claimed in claim 1, wherein said first operation member is slidable to expose said second operation member.

5. The battery lock mechanism as claimed in claim 1, wherein said first operation member is slidable to expose said second operation member, and wherein said first operation member has an abutment part which blocks said second operation member when said first operation member is in the first position and said abutment part does not block said second operation member when said first operation member is slidably operated into the second position to expose said second operation member.

6. A battery lock mechanism of a portable device having a battery accommodating unit accommodating a battery, said battery lock mechanism comprising:

a first operation member slidably operable into first and second positions; and a second operation member having a lock piece extending into the battery accommodating unit to lock the battery, said second operation member is prevented from being operable when said first operation member is in the first position, and said second operation member is slidably operable to withdraw the lock piece from the battery accommodating unit to release the battery from the battery accommodating unit when said first operation member is operated into the second position, said portable device further having a resume switch starting a resume operation when said first operation member is operated out of the first position.

7. The battery lock mechanism as claimed in claim 6, wherein said first operation member and said second operation member are slidable in directions different from each other.

8. The battery lock mechanism as claimed in claim 6, wherein said first operation member and said second operation member are slidable in directions at right angles to each other.

9. The battery lock mechanism as claimed in claim 6, wherein said first operation member is slidable to expose said second operation member.

10. The battery lock mechanism as claimed in claim 6, wherein said first operation member is slidable to expose said second operation member, and wherein said first operation member has an abutment part which blocks said second operation member when said first operation member is in the first position and said abutment part does not block said second operation member when said first operation member is slidably operated into the second position to expose said second operation member.

11. A battery lock mechanism of a portable device having a battery accommodating unit accommodating a battery, said battery lock mechanism comprising:

a first operation member slidably operable into first and second positions, said first operation member having a downwardly-extending abutment; and a second operation member prevented from being slidably operable when said first operation member is in the first position by said abutment abutting against an end face of said second operation member, and slidably operable to release the battery from a locked condition in the battery accommodating unit when said first operation member is operated into the second position.

* * * * *